United States Patent [19]

Baccus, Jr.

[11] Patent Number: 4,986,994
[45] Date of Patent: Jan. 22, 1991

[54] PROCESS FOR MAKING A LOW CALORIE BEVERAGE

[75] Inventor: John B. Baccus, Jr., Irving, Tex.

[73] Assignee: The Southland Corporation, Dallas, Tex.

[21] Appl. No.: 341,781

[22] Filed: Apr. 21, 1989

[51] Int. Cl.⁵ .................................................. A23L 2/00
[52] U.S. Cl. ................................. 426/330.3; 426/548; 426/590
[58] Field of Search ............... 426/285, 548, 591, 590, 426/599, 569, 565, 567, 330.3, 330.5, 66, 67, 312

[56] References Cited

U.S. PATENT DOCUMENTS

| | | | |
|---|---|---|---|
| 3,476,571 | 11/1969 | Block | 426/548 |
| 3,510,310 | 5/1970 | Breckwoldt | 426/548 |
| 3,930,053 | 12/1975 | Japikse | 426/590 |
| 3,966,994 | 6/1976 | Kennedy | 426/590 |
| 4,051,268 | 9/1977 | Shires | 426/548 |
| 4,486,455 | 12/1984 | Wolf | 426/285 |
| 4,495,213 | 1/1985 | Wolf | 426/285 |
| 4,497,835 | 2/1985 | Winston | 426/285 |
| 4,626,441 | 12/1986 | Wolkstein | 426/548 |
| 4,690,827 | 9/1987 | Kupper | 426/548 |
| 4,790,999 | 12/1988 | Ashmont | 426/592 |
| 4,808,428 | 2/1989 | Forsstrom | 426/569 |

Primary Examiner—Carolyn Paden
Attorney, Agent, or Firm—Baker & Botts

[57] ABSTRACT

A process for preparing a low calorie beverage syrup generally comprising the steps of mixing water and an artificial sweetener until completely dissolved. Microcrystalline cellulose is added to the mixer and vigorously agitated for proper dispersion and hydration of the cellulose. Xanthan gum, which has been wetted by propylene glycol, is added to the mixture and properly mixed. While the mixture is being stirred, a natural sweetener solution, a foaming agent and flavoring are added to the mixture to complete the syrup used to make a low calorie slush beverage.

26 Claims, 2 Drawing Sheets

PROCESS FOR MAKING A LOW CALORIE BEVERAGE

TECHNICAL FIELD OF THE INVENTION

This invention relates in general to a low calorie beverage and in particular to a low calorie slush beverage having small ice crystals formed evenly therethrough and a process for producing such beverage.

BACKGROUND OF THE INVENTION

As low calorie beverages such as diet soft drinks have become more popular due to recent developments in artificial sweeteners, consumer demand for additional types of palatable drinks has increased. A demand has thus developed for a diet soft drink, or low calorie beverage, which is semi-frozen. Beverages having a semi-frozen or slushy consistency have previously been developed and successfully distributed in the past, but the slushy drinks have had relatively high calorie content.

In the past, the beverage industry has been unable to successfully manufacture a low calorie syrup capable of being used in conventional semi-frozen beverage-making machines. Only syrups having a high percentage of natural sweeteners have been heretofore used in conventional semi-frozen beverage-making machines because of temperature limitations. Generally, such slush machines operate at temperatures between 26 degrees to 28 degrees Fahrenheit, and conventional solutions containing artificial sweeteners tend to freeze in the machine to create extreme operational problems. For example, previously attempted slush drinks using artificial sweeteners have frozen in the machines, cracking or breaking impellers in the machines.

A need has therefore arisen for a low calorie slush beverage with a depressed freezing point to accommodate the low temperatures in a conventional slush beverage machine in order to provide a low calorie slush drink with similar texture and flavor as previous high calorie slush drinks.

SUMMARY OF THE INVENTION

An important aspect of the present invention comprises a process for preparing a low calorie beverage syrup. Initially, an artificial sweetener solution is mixed with cellulose until the solids are dissolved in a quantity of water. Next, a natural sweetener and foaming agent are added to the mixer. Finally, a flavoring solution is added to complete the syrup. More specifically, in the first mixing step, aspartame is completely dissolved. Microcrystalline cellulose is then added to the mixer and vigorously stirred for approximately 15 minutes. A mixture of propylene glycol and xanthan gum, which has been premixed to insure complete wetting of the xanthan gum, is then added to the mixture. A natural sweetener is then added to the mixture. A foaming agent, which may comprise saponin-containing substances such as 50% yucca extract and 50% quillaia extract, is added to the mixture. Finally, a flavoring solution is added to the mixture to obtain the desirable taste.

After the syrup has been produced, it is placed in a blending tank along with water and carbon dioxide to create a pre-cooled mixture of the low calorie beverage. The mixture is placed in a chamber having a temperature range between approximately 26 degrees and 28 degrees Fahrenheit. The mixture is held in the chamber, which preferably has an internal rotating blade, until small ice crystals are formed to be evenly dispersed throughout the mixture. Finally, the low calorie beverage is poured out of the cylinder for consumption by the consumer.

The present invention presents technical advantages over the conventional low calorie beverage and other semi-frozen beverages because of the ability to produce a low calorie beverage with a desirable semi-frozen consistency, and which further is adaptable for formation in a conventional semi-frozen beverage-making machine.

BRIEF DESCRIPTION OF THE DRAWINGS

Other aspects of the invention and their advantages will be discerned after studying the Detailed Description in conjunction with the Drawings in which.

DETAILED DESCRIPTION OF THE INVENTION

Figure 1:
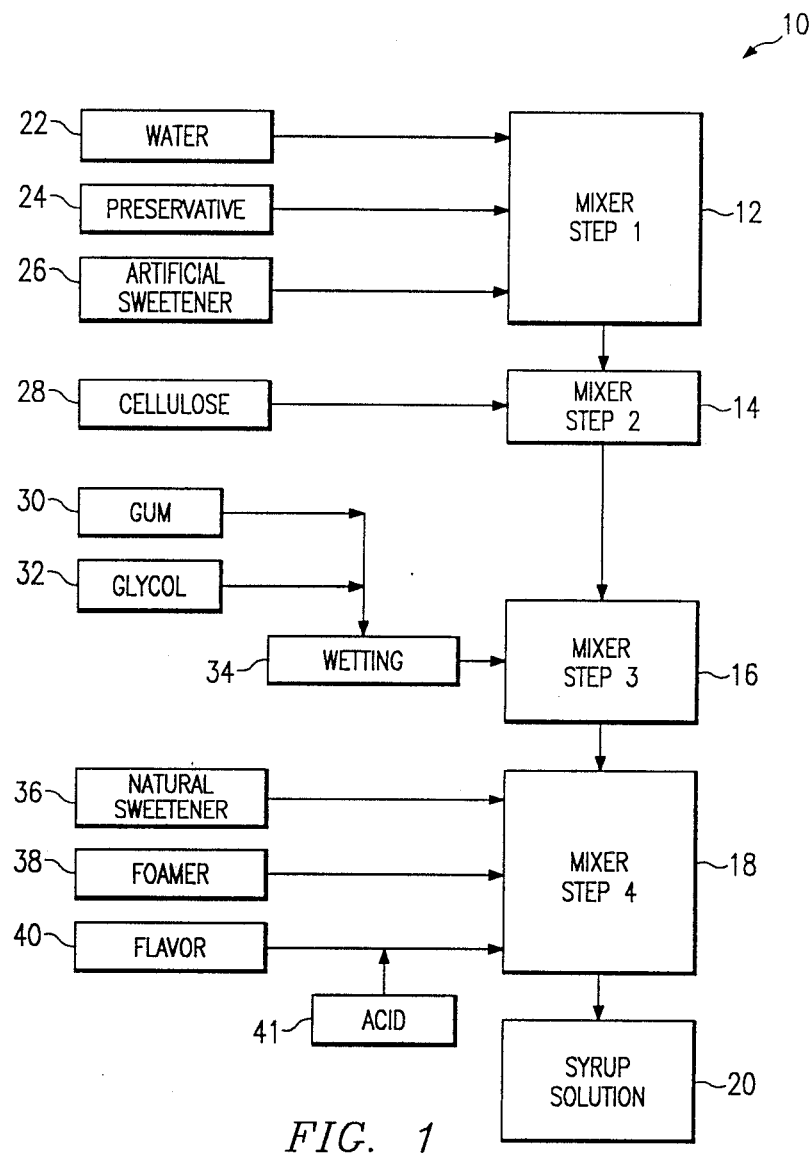
FIG. 1 is a block diagram of a low calorie beverage syrup manufacturing process according to the present invention.

Referring to FIG. 1, a process for producing a syrup necessary to manufacture a low calorie beverage is shown in a block diagram and is generally designated 10. Process 10 generally comprises a series of mixing steps 12, 14, 16 and 18. After a plurality of solutions have been added throughout the four mixing steps, a syrup solution 20 is produced which is subsequently put into canisters (not shown) for transportation to stores for further processing to make the low calorie beverage.

In FIG. 1, it can be seen that filtered water 22, a preservative 24, and an artificial sweetener 26 are added in mixing step 12. In its preferred embodiment, preservative 24 is a sodium benzoate USP grade manufactured by Kalama Chemical Incorporated. In an alternative embodiment, preservative 24 may be potassium sorbate solution. In its preferred embodiment, artificial sweetener 26 is aspartame. Artificial sweetener 26, in an alternative embodiment, can be saccharin, a mixture of aspartame and saccharin, or other suitable commercially available artificial sweeteners.

Syrup solution 20 comprises from 50 to 60 weight percent filtered water 22. Preservative 24 correspondingly comprises approximately 0.09 to 0.15 weight percent of syrup solution 20. Preferably, when using sodium benzoate as a preservative, it is desirable not to have a concentration higher than 0.15 weight percent in the finished syrup solution 20 because an "off" taste will begin to be noticeable. Artificial sweetener 26 may vary between approximately 0.11 and 0.13 weight percent of syrup solution 20 depending upon the desired taste of the final product.

Still referring to FIG. 1, water 22, preservative 24 and sweetener 26 are mixed at step 12 at a relatively high velocity until the solids are completely dissolved.

The mixing step 14 comprises adding microcrystalline cellulose 28. Microcrystalline cellulose 8 may vary between approximately 1.5 to 2.5 weight percent of syrup solution 20. In a preferred embodiment, microcrystalline cellulose 28 is approximately 1.79 weight percent of syrup solution 20 and may comprise for example Avicel CL-611 manufactured by FMC. The microcrystalline cellulose 28 should be present in a concentration sufficient to lower the freezing point of the low-calorie beverage to between 26° and 28° F. In mixing step 14, the mixture is vigorously agitated until the microcrystalline cellulose 28 is completely dispersed and hydrated to create a colloidal suspension.

Recently, the ice cream industry has used microcrystalline cellulose in low calorie ice creams to produce a desirable consistency which is palatable to individuals. This use in the ice cream industry has been found to be very advantageous for creating a solid or semi-solid ice cream. Using the microcrystalline cellulose in a beverage to create a pourable semi-frozen solution had not been successful until the present invention.

Prior to adding the solution in the next mixing step 16, a xanthan gum 30 and propylene glycol 32 are added in a separate wetting step 34 and mixed to insure complete wetting of xanthan gum 30 by the propylene glycol 32. In alternative embodiments, the wetting agent can be glycerine or polysorbate-80. Wetting step 34 reduces the possibility that xanthan gum 30 will lump into clusters. Xanthan gum 30 and propylene glycol 32 make up between approximately 0.15 and 0.25 weight percent and between approximately 0.5 and 2.0 weight percent of syrup solution 20, respectively. The wetted xanthan gum 30 is added to and stirred in mixing step 16. Xanthan gum 30 functions to maintain the colloidal suspension of cellulose 28 and to build the viscosity of syrup solution 20. In an alternative embodiment, xanthan gum 30 may be replaced by gum tragacanth. Propylene glycol 32 functions as a manufacturing aid to wet xanthan gum 30 and to help depress the freezing point of the entire solution in subsequent processing. Special care is taken to limit the amount of propylene glycol 32 because of the bitter aftertaste which may be experienced if too much is used.

After proper mixing has been conducted at step 16, the process proceeds to a fourth mixing step 18. Initially, natural sweetener 36 is added. Natural sweetener 36 may be one or a combination of fructose, sucrose, dextrose, or malto-dextrin.

A desirable finished product has also been prepared using a polydextrose solution in place of the above natural sweeteners. Polydextrose has the added advantage of having only 25 percent of the calorie content of conventional natural sweeteners.

Natural sweetener 36 makes up between approximately 27.3 and 47.3 weight percent of syrup solution 20. Preferably, natural sweetener 36 makes up approximately 37.3 weight percent of syrup solution 20, and the natural sweetener 36 itself is made of 71 weight percent fructose. The natural sweetener 36 may vary in fructose concentration, with more or less filtered water 22 being added to adjust the final concentration of fructose within syrup solution 20. The second part of the mixing step 18 comprises the step of adding a foaming agent 38. Foaming agent 38 preferably comprises a 50%-50% mixture of a yucca extract and a quillaia extract distributed by Bell Chemical under the trademark Super Foam ™ foaming agent. The active ingredient of both yucca extract and quillaia is saponin, which stabilizes the foam after it has been generated. It has been found that an acceptable beverage can be produced which has foaming agent 38 made of 100% yucca extract. After adding foaming agent 38, flavor 40 is added and the entire solution is mixed until there is complete blending of all the ingredients.

When using a cola flavoring, no further step is necessary to complete the formation of syrup solution 20. However, when other flavors such as strawberry or cherry are used to make syrup solution 20, citric acid 41 is added to the flavor stream to enhance the taste of syrup solution 20. In the case of cola, phosphoric acid is already contained within the cola solution. Citric acid 41 is added last because it tends to retard hydration of microcrystalline cellulose 28 contained in syrup solution 20. In an alternative embodiment, citric acid 41 may be replaced by malic acid. As can be appreciated, many flavors 40 can be added to create the desired flavor of syrup solution 20 such as: cola, orange, lime, lemon-lime, creme soda, cherry, strawberry, or grape.

Figure 2:
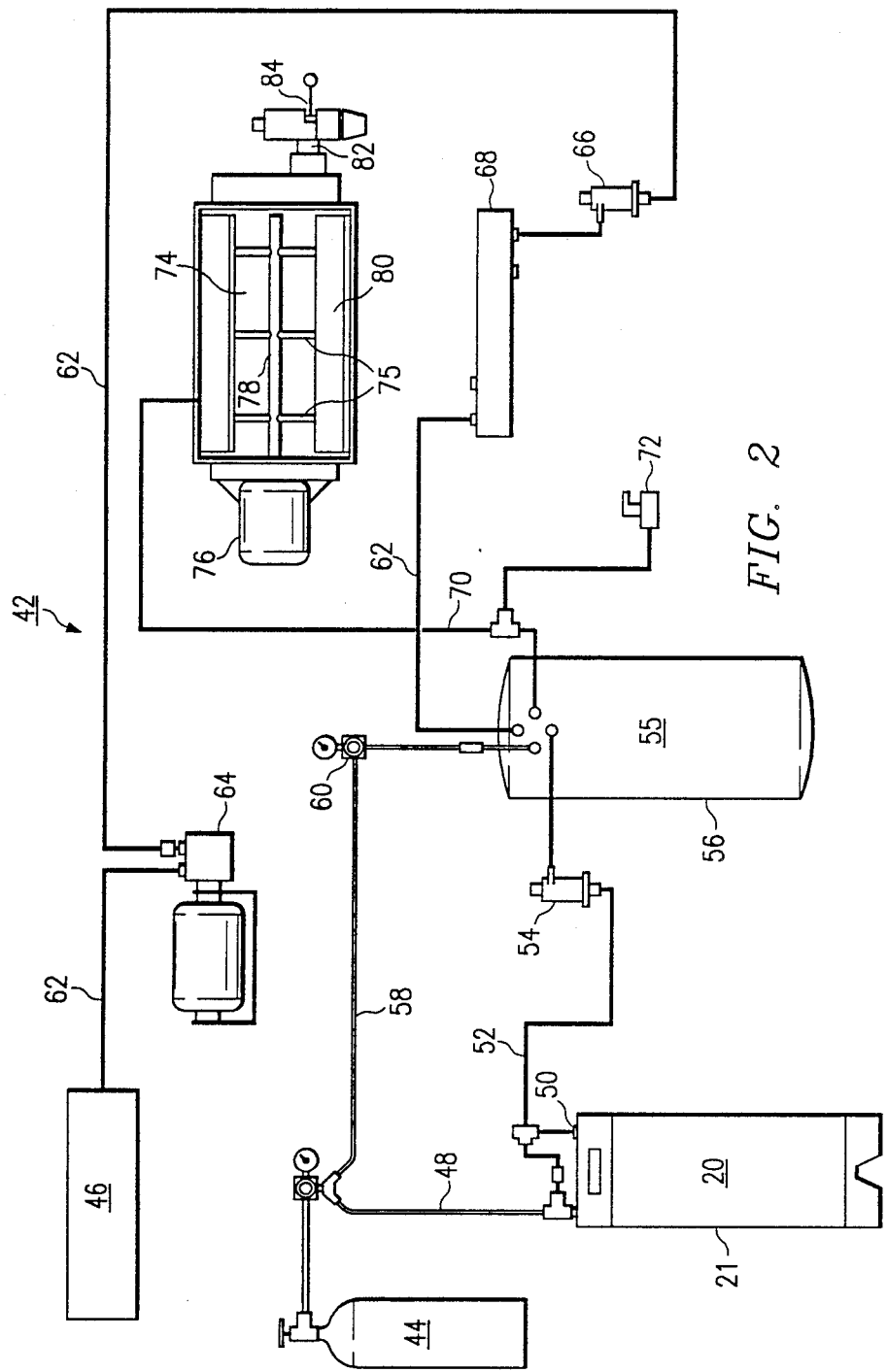
FIG. 2 is a schematic diagram of exemplary apparatus suitable for creating a low calorie beverage having small ice crystals dispersed throughout the beverage.

Referring now to FIG. 2, a schematic diagram of an exemplary apparatus 42 which forms the final low calorie beverage can be seen. A canister 21 containing syrup solution 20 is coupled to a carbon dioxide source 44 by a carbon dioxide line 48. Likewise, canister 21 is connected to a blending tank 56 by a line 52 which has a flow regulator 54 coupled thereon for controlling the flow rate of syrup solution 20 to blending tank 56. Carbon dioxide source 44 is coupled to blending tank 56 via line 58 which has a pressure regulator 60 attached thereon. A water source 46 is connected to a water pump 64 by a line 62. The discharge end of pump 64 is connected to a flow regulator 66 by line 62. Flow regulator 66 is coupled to a pre-cooled plate 68. Finally, water line 62 connects pre-cooled plate 68 to blending tank 56.

A line 70 connects blending tank 56 to a freeze cylinder 74. Internally, freeze cylinder 74 has a shaft 78 coupled to a motor 76. Shaft 78 has a plurality of connectors 75 integrally formed with a plurality of blades 80. Finally, freeze cylinder 74 is connected to a dispensing valve 84 by a line 82.

In its operation, canister 21 containing syrup solution 20 is connected to transfer syrup solution 20 to blending tank 56. Along with syrup solution 20, carbon dioxide and water are added to blending tank 56 to create a final mixture 55 necessary to produce the low calorie beverage.

As can be seen in the drawing, carbon dioxide is transported through carbon dioxide line 48 to pressurize canister 21. After pressurization of canister 21, syrup solution 20 is transported out of an opening 50 through line 52. Syrup flow regulator or 54 is used to control the rate of flow into blending tank 56.

While syrup 20 is being transported to blending tank 56, a stream from water source 46 is being transported through line 62 to water pump 64. Once water has been pressurized through pump 64, water is transported through line 62 to pre-cooled plate 68. Flow regulator 66 permits adjustments to the rate of water 46 being passed through pre-cooled plate 68. After initial cooling has been conducted, a stream from water source 46 is injected into blending tank 56. In a preferred embodiment, the ratio of syrup to water is 1:4.5.

To provide the necessary carbonation of the solution, carbon dioxide from source 44 is transported through line 58 to pressure flow regulator 60. From pressure regulator 60, carbon dioxide is passed into blending tank 56.

A pre-cooled, low calorie beverage mixture 55 is contained within blending tank 56. This pre-cooled mixture 55 is passed through line 70 to freeze cylinder 74. A product sample valve 72 is connected to line 70 to allow the operator to provide proper quality control of the product.

In freeze cylinder 74, motor 76 continuously rotates shaft 78. Blades 80 continuously scrape the wall of freeze cylinder 74 to insure that there is no build-up of ice on the wall. In its operation, freeze cylinder 74 is held at a temperature range between approximately 26 degrees to 28 degrees Fahrenheit. Once the solution is held in freeze cylinder 74 for approximately 10 minutes, the desired slushy consistency of small ice crystals evenly distributed throughout mixture 55 is obtained. Finally, mixture 55 is passed through line 82 to valve 84 to discharge the low calorie beverage for consumption.

In the prior art, because of the inability to have a low-calorie solution capable of withstanding temperatures as low as 26 degrees to 28 degrees Fahrenheit, freeze cylinder 74 would freeze up and cause damage to blades 80, shaft 78 and motor 76. Additionally, prior to the use of the present invention, line 82 and valve 84 would freeze up because of the icing characteristics of the artificially sweetened solution when submitted to a temperature below 32 degrees Fahrenheit.

An example of the preferred embodiment is presented for illustration below:

EXAMPLE

Initially, 288 gallons of filtered water, 5 pounds of aspartame, and 4 pounds of sodium benzoate were added to a mixer and stirred until all the solids were completely dissolved. Next, 75 pounds of Avicel CL-611 microcrystalline cellulose were added and vigorously agitated for 15 minutes. A premixed solution having 7.3 gallons of propylene glycol and 7.44 pounds of xanthan gum manufactured by Kelco Company (trademark Keltrol-F) was added to the mixer and mixed for 5 minutes. While the mixer continued to rotate, 139 gallons of high fructose corn syrup having 71 weight percent fructose and dextrose was added to the mixer. Next, 122 fluid ounces of 50% yucca extract and 50% quillaia extract were added to the mixer. Finally, 14.0625 gallons of cola flavoring were added to the mixer to create the final syrup product. The syrup had a refractometer Brix index number of 29.0 and a pH of 2.6. The density of the syrup solution was 9.32 pounds per gallon and it had a dark brown coloring.

After the syrup was mixed with water at a ratio of 1:4.5 syrup to water, it was mixed with carbon dioxide. The solution of syrup, water and carbon dioxide was stirred at a temperature of 27° F. in the freeze cylinder of a semi-frozen beverage making machine manufactured by Cornelius Corporation until the desirable consistency was obtained. The beverage was smooth in the mouth and its texture resembled the conventional beverage having a high natural sweetener concentration. In its final form, its volume increased by approximately 100% due to carbon dioxide entrainment.

In summary, an advantageous low calorie beverage has been disclosed that features the use of a microcrystalline cellulose and which has a semi-frozen consistency when reduced to a temperature range between 26 degrees to 28 degrees Fahrenheit. It has been found that the total calorie content can be reduced by approximately 55 percent. Specifically, it has been found that the present invention contains approximately 6% natural sweetener as compared to 13% natural sweetener when artificial sweeteners are not used. These figures can be further improved by replacing the natural sweeteners used in the present invention with either Sorbitol or polydextrose.

While preferred embodiments of the invention and their advantages have been disclosed in the above-detailed description, the invention is not limited thereto but only by the spirit and scope of the appended claims.

What is claimed is:

1. A process for preparing a low calorie beverage comprising the steps of:
    mixing an artificial sweetener solution and microcrystalline cellulose in a mixer, said microcrystalline cellulose in an amount sufficient to lower the freezing point of the beverage to be prepared;
    adding a natural sweetener to the mixer;
    adding a nongaseous foaming agent to the mixer to stabilize foam generated during future processing;
    adding flavoring to the mixer to complete the formation of a syrup;
    mixing filtered water, the syrup and carbon dioxide to create a mixture, foam generated during mixing being stabilized by said foaming agent;
    regulating the temperature of a freeze cylinder to between approximately 26 degrees and 28 degrees Fahrenheit;
    transferring said mixture of said water, the syrup and said gas to a freeze cylinder;
    mixing said mixture of said water, the syrup and said gas in the freeze cylinder until small ice crystals form throughout said mixture; and
    pouring said mixture of said water, the syrup and said gas out of the freeze cylinder to obtain the low calorie beverage.

2. The process of claim 1, and further comprising the step of adding a mixture of a wetting agent and a viscosity builder to the mixer after said step of mixing said artificial sweetener solution and microcrystalline cellulose and before said step of adding said foaming agent, said mixture of said wetting agent and said viscosity building reducing clustering of the viscosity building compounds.

3. The process of claim 2, wherein said wetting agent solution is propylene glycol.

4. The process of claim 2, wherein said viscosity building is xanthan gum.

5. The process of claim 2 and further comprising a step of completely wetting said viscosity builder the said wetting agent before adding said mixture of said wetting agent and said viscosity builder to the mixer.

6. The process of claim 1, wherein said artificial sweetener is selected from a group consisting of aspartame, saccharin and mixtures thereof.

7. The process of claim 1, further comprising the step of adding a preservative to the mixer before said step of mixing said artificial sweetener solution and said microcrystalline cellulose.

8. The process of claim 7, wherein said preservative is sodium benzoate.

9. The process of claim 1, wherein said foaming agent contains saponin.

10. The process of claim 9, wherein said foaming agent contains a yucca extract and a quillaia extract.

11. The process of claim 1, wherein said flavoring is selected from the group consisting of cola, orange, lime, lemon-lime, creme soda, cherry, strawberry and grape.

12. The process of claim 11, wherein said flavoring is added to the syrup not containing an acid, the process further comprising the step of adding a citric acid solution to the mixer while simultaneously adding said flavoring.

13. A process for creating a beverage from a syrup after the preparation of the syrup in the mixer, the beverage having small ice crystals evenly dispersed therethrough such that the beverage mixture is pourable from a freeze chamber, the process comprising the steps of:

mixing an artificial sweetener solution and microcrystalline cellulose in a mixer, said microcrystalline cellulose lowering the freezing point of the beverage to be later manufactured;
adding a natural sweetener to the mixer;
adding a nongaseous foaming agent to the mixer to stabilize foam later generated during manufacture of the beverage;
adding flavoring to the mixer to complete the syrup;
mixing filtered water, the syrup and a carbon dioxide gas to create a mixture, foam generated during mixing being stabilized by said foaming agent;
regulating the temperature of the freeze cylinder to between approximately 26 degrees and 28 degrees Fahrenheit;
transferring said mixture of said water, the syrup and said gas to a freeze chamber having a freeze cylinder;
rotating said mixture of said water, the syrup and said gas in the free cylinder until small ice crystals form throughout said mixture; and
pouring said mixture of said water, the syrup and said gas out of the freeze cylinder to obtain the low calorie beverage.

14. The process of claim 13, wherein said artificial sweetener is selected from a group consisting of aspartame, saccharin and mixtures thereof.

15. A process for preparing a low calorie beverage comprising the steps of:

mixing an artificial sweetener solution and microcrystalline cellulose in a mixer, said microcrystalline cellulose lowering the freezing point of the beverage to be prepared;
adding a natural sweetener to the mixer;
adding a nongaseous foaming agent to the mixer to stabilize later generated foam;
adding flavoring to the mixer to complete the syrup;
adding a natural sweetener to the mixer;
adding a nongaseous foaming agent to the mixer to stabilize later generated foam;
mixing filtered water, the syrup and carbon dioxide to create a mixture, foam generated during mixing being stabilized by said foaming agents;
regulating the temperature of a freeze cylinder to between approximately 26 degrees and 28 degrees Fahrenheit;
transferring said mixture of said water, the syrup and said gas to a freeze cylinder;
mixing said mixture of said water, the syrup and said gas in the freeze cylinder until small ice crystals form throughout said mixture; and
pouring said mixture of said water, the syrup and said gas out of the freeze cylinder to obtain the low calorie beverage.

16. The process of claim 15, and further comprising the step of adding a foaming agent to the mixer after said step of adding said natural sweetener and before said step of adding flavoring to stabilize foam generated during future processing.

17. The process of claim 15, and further comprising the step of adding a mixture of a wetting agent and a viscosity builder to the mixer after said step of mixing said artificial sweetener solution and microcrystalline cellulose and before said step of adding said foaming agent.

18. The process of claim 17, wherein said wetting agent is propylene glycol.

19. The process of claim 17, wherein said viscosity builder is xanthan gum.

20. The process of claim 19, and further comprising a step of completely wetting said viscosity builder with said setting agent before adding said mixture of said wetting agent and said viscosity builder to the mixer.

21. The process of claim 15, wherein said artificial sweetener is selected from a group consisting of aspartame, saccharin and mixtures thereof.

22. A process for preparing a low calorie beverage comprising the steps of:

dissolving artificial sweetener in a quantity of water in a mixing mixer;
adding microcrystalline cellulose to a mixer;
adding a mixture of propylene glycol and xanthan gum to the mixer;
adding a natural sweetener to the mixer;
adding a foaming agent to the mixer;
adding a flavoring solution and mixing until there is a complete blending to complete the syrup;
mixing water, the syrup and a carbon dioxide gas to create a mixture;
cooling said mixture to a temperature between approximately 26 degrees and approximately 28 degrees Fahrenheit to form small ice crystals; and
stirring said mixture until said ice crystals are evenly dispersed therethrough to create a pourable beverage.

23. A process for preparing a low calorie beverage syrup as recited in claim 22, wherein said artificial sweetener is selected from the group consisting of aspartame and saccharin.

24. The process of claim 22, and further comprising the step of adding a preservative to the quantity of water before adding the microcrystalline cellulose.

25. A process for preparing a low calorie beverage syrup and preparing a low calorie beverage from the syrup, comprising the steps of:

mixing water and an artificial sweetener in a mixer;
adding microcrystalline cellulose to the mixer;
adding a viscosity builder to the mixer;
adding a natural sweetener to the mixer;
adding a foaming agent to the mixer;
adding flavor to the mixer to complete the syrup;
adding said syrup, water and a carbon dioxide gas to a blending tank to create a mixture;
transferring said mixture to a freeze cylinder;
regulating the temperature of the freeze cylinder to a temperature between approximately 26 degrees and approximately 28 degrees Fahrenheit; and
mixing said mixture in the freeze cylinder to create a plurality of small-sized ice crystals evenly formed in said mixture to create the beverage.

26. A process for preparing a low calorie beverage as recited in claim 25, and further including the step of wetting the viscosity builder with a wetting agent prior to adding the viscosity builder to the mixer.

* * * * *

UNITED STATES PATENT AND TRADEMARK OFFICE
CERTIFICATE OF CORRECTION

PATENT NO. : 4,986,994

DATED : January 22, 1991

INVENTOR(S) : John B. Baccus, Jr.

It is certified that error appears in the above-identified patent and that said Letters Patent is hereby corrected as shown below:

Column 1, line 56, after "mixture" add --.--.

Column 2, line 63, change "8" to --28--.

Claim 2, Column 6, line 40, change "building" to --builder-- both instances.

Claim 5, Column 6, line 47, after "builder" insert --with--.

Signed and Sealed this

Thirty-first Day of August, 1993

BRUCE LEHMAN

Commissioner of Patents and Trademarks